(12) United States Patent
Beaudry et al.

(10) Patent No.: US 6,597,195 B1
(45) Date of Patent: Jul. 22, 2003

(54) METHOD OF AND CASSETTE STRUCTURE FOR BURN-IN AND LIFE TESTING OF MULTIPLE LEDS AND THE LIKE

(75) Inventors: David N. Beaudry, Henniker, NH (US); Christopher N. Durell, Georges Mills, NH (US); James F. Kulacz, Franklin, NH (US)

(73) Assignee: Labsphere, Inc., Sutton, NH (US)

( * ) Notice: Subject to any disclaimer, the term of this patent is extended or adjusted under 35 U.S.C. 154(b) by 0 days.

(21) Appl. No.: 09/628,093

(22) Filed: Jul. 28, 2000

(51) Int. Cl.⁷ .................. G01R 31/26; G01R 31/308
(52) U.S. Cl. ............................. 324/767; 324/753
(58) Field of Search .................. 324/767, 556, 324/142, 67, 750, 752; 356/41; 250/205, 239

(56) References Cited

U.S. PATENT DOCUMENTS

| | | | | |
|---|---|---|---|---|
| 4,489,477 A | * | 12/1984 | Chik et al. ............... | 324/767 |
| 4,611,116 A | * | 9/1986 | Batt ............................ | 250/239 |
| 4,926,545 A | * | 5/1990 | Pimpinella et al. ........ | 174/52.4 |
| 5,381,103 A | * | 1/1995 | Edmond et al. ............ | 324/753 |
| 5,537,203 A | | 7/1996 | Carr | |
| 5,699,103 A | * | 12/1997 | Fleming ..................... | 324/767 |
| 5,793,220 A | * | 8/1998 | Thompson, Sr. ............ | 324/767 |
| 6,133,994 A | * | 10/2000 | Mathews et al. ............ | 356/41 |
| 6,222,172 B1 | * | 4/2001 | Fossum et al. ............. | 250/205 |

* cited by examiner

Primary Examiner—Kamand Cuneo
Assistant Examiner—Russell M. Kobert
(74) Attorney, Agent, or Firm—Rines and Rines

(57) ABSTRACT

A novel cassette structure technique for enabling simultaneous burn-in of pluralities of LEDs plugged into the cassettes, and then, with the cassettes mounted within a light integrating sphere system, separately measuring the spectral flux emitted by each successive individual LED plugged into the cassette to determine optical and electrical characteristics of each LED separately from the others.

8 Claims, 4 Drawing Sheets

Figure 1:
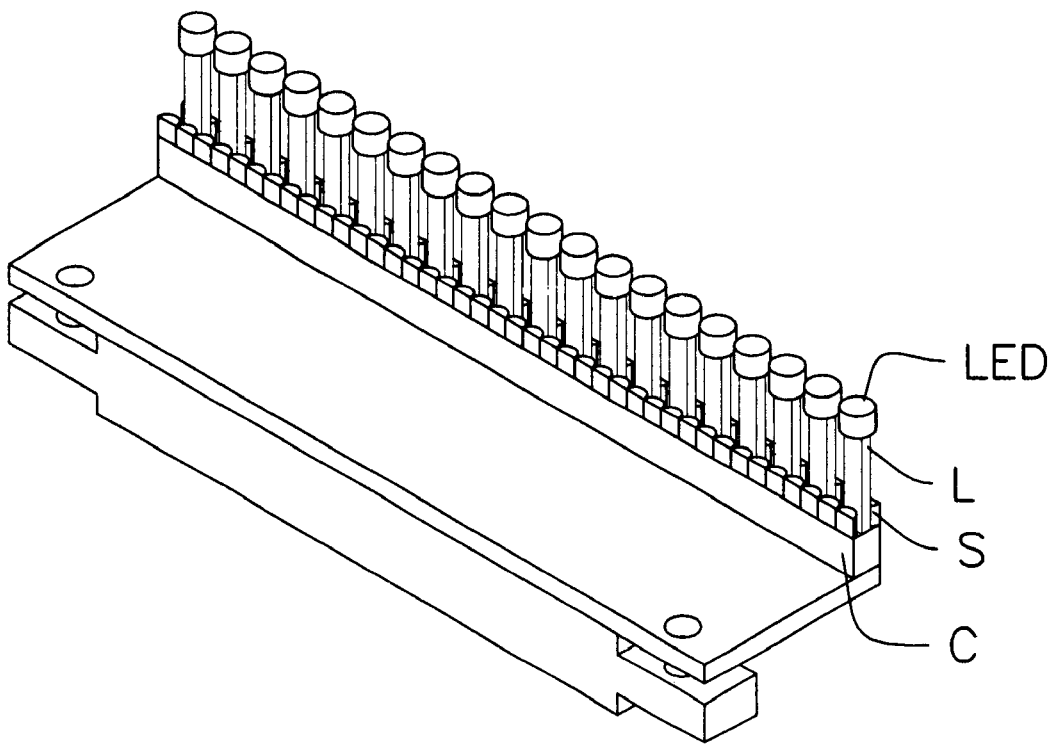

CASSETTE LOADED IN SPHERE
LED LIGHTED INDIVIDUALLY

LED CASSETTE

CASSETTES LOADED IN BURN-IN RACK
ALL LEDS LIGHTED

METHOD OF AND CASSETTE STRUCTURE FOR BURN-IN AND LIFE TESTING OF MULTIPLE LEDS AND THE LIKE

The present invention relates to apparatus and techniques for aiding the design, quality control and manufacturing testing of light sources, being more particularly directed to light emitting diode (LED) light sources and the use of integrating spheres for measuring their output.

BACKGROUND

Manufacturers of various lamp-type light sources have long used optical integrating spheres for measuring the output characteristics of the lamps both during the design and quality control processes. In the design phase, integrating spheres are used to test new designs, and in the manufacturing phase, for SPC (statistical process control) testing and then life testing with periodic measurements of the lamp output characteristics of each lamp. Current integrating spheres are, for example, of the type described in U.S. Pat. No. 5,537,203 of Labsphere Inc., the common assignee of the present invention, marketed under the mark Spectralon®, further described in an article entitled Handbook of Applied Photometry, Chapter 5, Measurement Procedures, AIP Press, pp. 133–177, and CIE 127-1997 Technical Report, Measurement of LEDs. As is well-known, such measurements involve measuring the spectral flux emitted by the lamps, from which are calculated the characteristics of total radiant flux (watts), total photopic flux (lumens), spectrum (peak wavelength, center wavelength, centroid, and full width half max—FWHM—) and chromaticity (x,y, dominant wavelength and parity).

In more recent years, with the emergence of light emitting diodes, LEDs have become an important alternate light source with efficiencies greater than incandescent and fluorescent lamps and with further advantages of small size, light weight and durability. These applications, however, have placed stringent demands on the optical characteristics of LEDs, which serve as the baseline for product quality and product design.

The above-mentioned characteristics of small physical size and also flux levels, spectrum and spatial distribution, moreover, separate LEDs from typical light sources which are generally employed and measured for photometric and radiometric quantities. With LEDs, on the other hand, it is often difficult to achieve a high-level of photometric or radiometric measurement accuracy due to uncertainties within that type of measurement equipment and test set-up. Additionally, traditional photometrics, because of their inability to simulate the response of the human eye at the ends of the visible spectrum, can generate significantly flawed data when testing red, blue and white LEDs.

The obvious difference in size between light bulbs and LEDs, furthermore, presents additional difficulties as well, such as marking an identity number on each LED and obviating the awkwardness in repeatedly handling the fragile leads of LEDs, plugging them in and out, especially during life testing.

The present invention, accordingly, addresses all of the above problems, providing a novel cassette structure for holding multiple LEDs on a single cassette for both burn-in and then for integrated sphere optical measurements during life testing, while enabling a large enough space for identification marking and eliminating the need repeatedly to plug the LED leads in and out, and with the cassette containing contacts rated for multiple insertions—the cassette being the only item that is inserted and removed. Underlying the invention is an operation whereby all of the cassette-mounted LEDs are lighted simultaneously during burn-in, and all of the cassette-mounted LEDs are mounted in the integrating sphere for measurement testing, but they are (sequentially or successively) lighted separately and individually, for such measurements.

OBJECTS OF INVENTION n object of the present invention, therefore, is to provide a new and improved method of and cassette structure for high-speed multi-purpose LED testing, and that addresses the previously described prior testing and handling limitations.

A further object is to provide a novel LED test station for enabling burn-in and optical integrated sphere spectral flux measurements.

Other and further objects will be explained hereinafter and are more fully delineated in the appended claims.

SUMMARY

In summary, however, from one of its important viewpoints, the invention embraces a method of holding multiple LEDs for burn-in and optical and electrical life testing measurements, that comprises, providing a cassette with contacts rated for multiple insertions and adapted to receive the plurality of LEDs with leads thereof plugged therein; inserting the cassette holding the plurality of LEDs into a fixture board and electrically energizing the LEDs within the cassette to light all the LEDs simultaneously for burn-in; thereupon inserting the cassette holding the plurality of LEDs within a light-integrating sphere system and successively lighting each LED individually while conducting optical and electrical life-testing measurements thereof within the sphere system.

Preferred and best mode designs and implementation are later presented.

DRAWINGS

Figure 2:
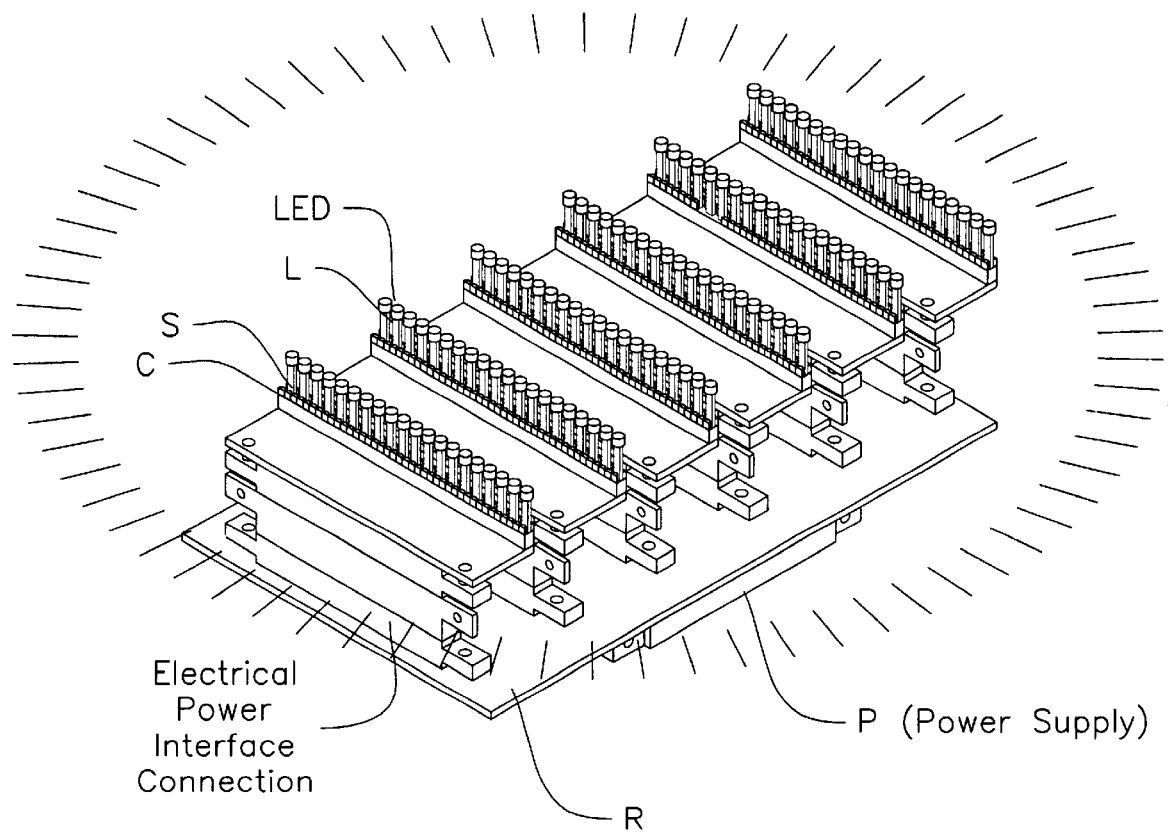
Figure 3:
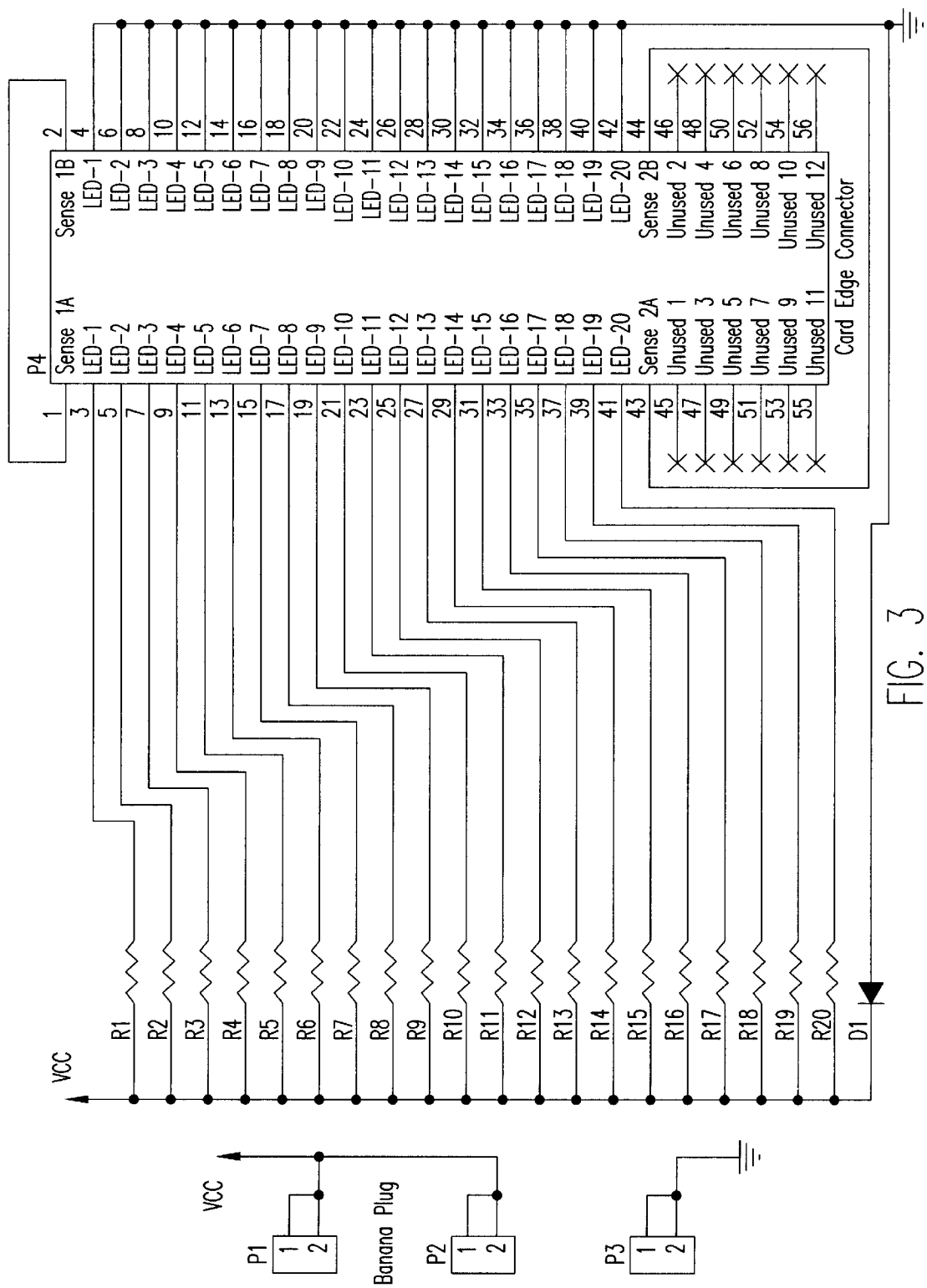
Figure 4:
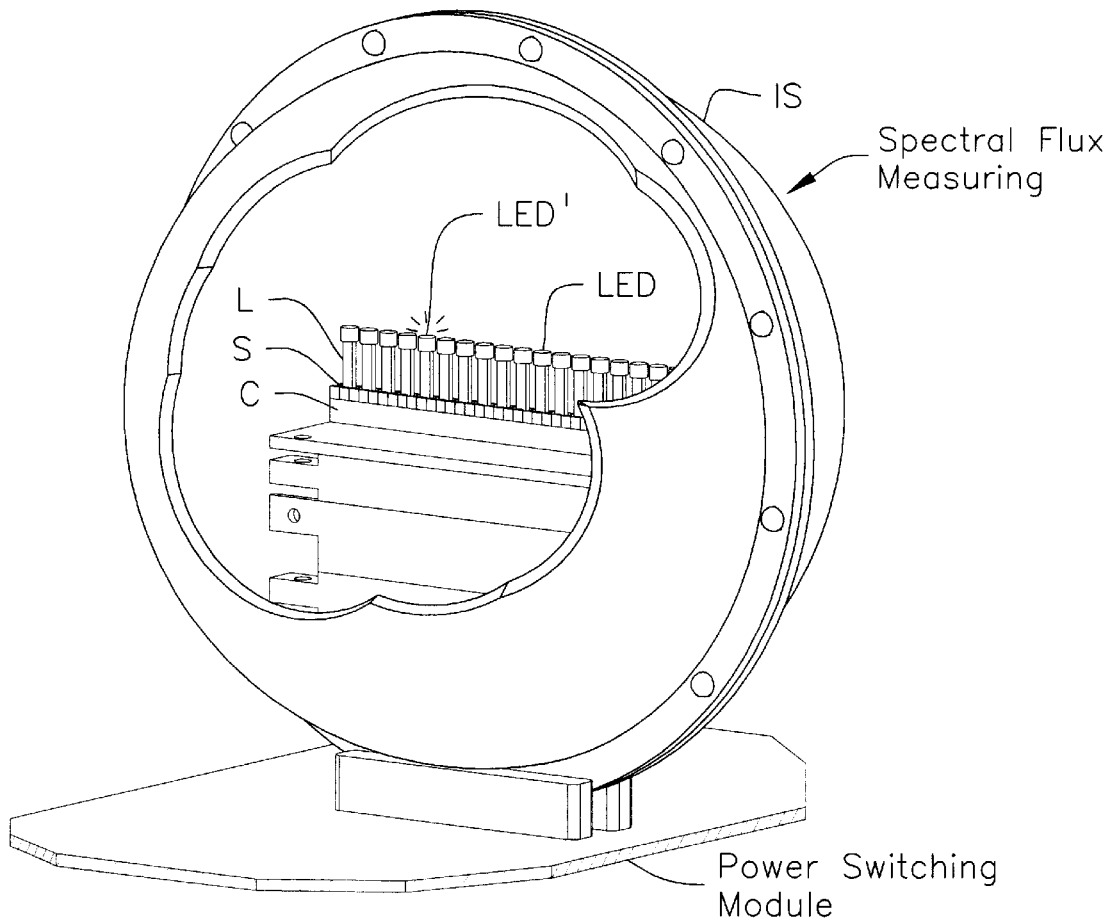

The invention will now be described with reference to the accompanying drawings, FIG. 1 of which is an isometric view of a multiple-LED cassette structure into which a plurality of LED leads have been plugged in accordance with the present invention, FIG. 2 is a similar view of a plurality of cassettes of the type shown in FIG. 1 loaded into a burn-in rack for simultaneously illuminating all the LEDs;

FIG. 3 is a wiring diagram for the burn-in board electrical energizing connections, and FIG. 4 is an isometric view of one of the LED-carrying cassettes within an integrated sphere, shown partly broken away to expose the cassette, for sequential individual LED lighting and spectral flux test and electrical measurements.

DESCRIPTION OF PREFERRED EMBODIMENTS

As above explained, the drawings show preferred LED cassette and measurement structures designed in accordance with the present invention to serve as a multi-purpose LED test station adapted for high volume throughput. The system applies a variety of optical and electrical test measurements to arrays of LEDs plugged into longitudinally extending cassettes, shown at C in FIGS. 1, 2 and 4, with the LED lead conductors L plugged into a row of spring contacts S, illustrated as mounted along the inner upper edge of the cassette.

For the burn-in phase above mentioned, parallely mounted pluralities of such cassettes C are mounted, (shown in FIG. 2 as each carrying 20 LEDs), upon electrical power interface bar connections, so-labeled, and mounted as a burn-in rack R. The burn-in function is performed by providing power at P, FIG. 2, and at VCC, FIG. 3, simultaneously to all the LEDs of all the cassettes C to light them all for the desired burn-in period.

As earlier described, in the subsequent manufacturing phase, the cassettes are mounted within an optical integrated sphere IS, as of the types earlier referenced, where, instead of all being powered together as in the burn-in phase, they are successively and individually energized (as shown at LED') by a power switching module, so-labeled. During such individual powering, the spectral flux of each LED is individually measured within the integrated sphere as is well known and as is described in detail, for example, in the previously cited publications, such details not being part of the novelty of the invention and thus not fully illustrated and detailed herein. Both optical and electrical properties of the LED's are thereby determined in well-known manner, including spectral flux from which are calculated total radiant and luminous flux, peak wavelength, dominant wavelength, spectral bandwidth at half intensity of spectral radiant flux, purity, and chromaticity; and forward voltage and leakage current are measured in well-known fashion as well, through database integration at each stage of the test sequence.

In a prototype version of the invention, the workstation housed a 9-inch (25.4 cm) Spectralon® integrating sphere of Labsphere, Inc., a precision power supply, a back-lit research grade CCD spectroradiometer, a tungsten-halogen constant-current power supply, a common single dimensional bar code reader, and a 500 MHz personal computer and monitor. The system contained cassettes and 200 carrier burn-in racks for lamp testing. A set of three tungsten halogen spectral flux standards with calibration traceable to National Institute of Standards and Technology (NISTY was included with each system.

The system's integrating sphere IS was optimized with a mirrored baffle, an infrared filter, and a fiber optic bundle, all of which helped to remove spatial sensitivity and maximized optical throughput. Spectral data from the spectrograph was measured in 1 nm increments. System software compared the spectral data to the flux data emitted by a calibration lamp. The spectral data was summed across the visible spectrum and converted to luminous data using the comparison method as recommended by CIE-127 technical report and as described in the earlier cited publications. Total uncertainty of the optical measurement results are traceable to NIST and quantified to be accurate within 3–4%.

The electrical system included a specifically designed multiplexer board and LED cassettes. The multiplexer board acts as the switching mechanism that sequenced through each LED mounted on the cassette in as little as 4.5 seconds, in which all optical and electrical measurements were performed. The cassette was designed to hold thru-hole LEDs with a 0.60 mm square 2-post mounting configuration, and was used both as a measurement board and a burn-in board. Up to 20 LEDs were loaded manually onto the cassette. The cassette was mounted into a specifically designed holder inside the integrating sphere where an operator, with a touch of the computer keystroke, can select parameters for each test.

The software used to implement the measurements included a networkable PC with application software operating in Windows 98 environment. The software was multi-threaded so that data entry, testing, and report generation were executed simultaneously. Customer specific tracking data may be imported into the system via a "key board wedge" bar code reader. The bar code reader is capable of reading common single dimensional bar codes.

Once the tracking data has been entered into the system, the LEDs are tested, and collected data is then compared against customer-provided test parameters. Up to 50 test parameters can be entered into the system to be used as a pass/fail criteria. Upon completion of a test sequence, results are displayed on the computer screen and stored on the PC. The system is capable of tracking and storing test data on a single LED for up to ten individual testing cycles. The test results are easily exported into Microsoft Excel or Access for further statistical analysis.

Further modifications will occur to those skilled in this art, and such are considered to fall within the spirit and scope of the invention as defined in the appended claims.

What is claimed is:

1. A method of holding multiple LEDs for burn-in and optical and electrical life testing measurements, that comprises, providing a cassette with contacts rated for multiple insertions and adapted to receive a plurality of LEDs with leads thereof plugged therein; inserting said cassette holding the plurality of LEDs into a fixture board and electrically energizing the LEDs within the cassette to light all the LEDs simultaneously for burn-in; following said burn-in, thereupon inserting the cassette holding the plurality of LEDs within a light-integrating sphere system and successively lighting each LED individually while conducting optical and electrical life-testing related measurements thereof within the sphere system, and wherein the forward voltage and leakage current is measured for each LED individually at each stage f the testing sequence.

2. The method of claim 1 wherein the cassette is sufficiently large to permit the marking thereon of identification numbers, with the use of the cassette eliminating the need repeatedly to plug LED leads in and out for burn-in and life-testing measurements.

3. The method of claim 1 wherein the optical testing measurements include separately measuring the spectral flux emitted by each individual LED.

4. The method of claim 3 wherein, from such spectral radiant flux emission, one or more of the total radiant flux, the total photopic flux, the spectrum, and chromaticity is determined.

5. A cassette structure for holding multiple LEDs for burn-in and optical and electrical life testing measurements, having, in combination, a longitudinally extending cassette provided with a row of electrical contacts adapted to receive the leads of successive LEDs plugged therein; means for powering the cassette to light all the LEDs in the cassette simultaneously for burn-in; means for subsequently mounting the cassette within a light integrating sphere system and for separately powering successive LED's individually therein to enable the light integrating sphere system separately to measure the spectral flux emitted by each individually illuminated LED for determining one or more of radiant and photopic flux, spectrum and chromaticity, and wherein means is provided for enabling measuring forward voltage and leakage current for each LED individually at each stage of the testing sequence.

6. The cassette structure of claim 5 wherein multi similar cassettes are parallely mounted on a burn-in rack board to which power is supplied by interface connections to all the cassettes to enable simultaneous burn-in lighting of all the cassette-mounted LEDs.

7. The cassette structure of claim 6 wherein each row of cassette contacts is adapted to receive of the order of 20 sets of LED leads.

8. The cassette structure of claim 5 wherein multi similar cassettes are mounted in the integrating sphere, in turn connected to a power switching module for enabling the successive individual lighting of successive LED's for individual testing thereof.

* * * * *